United States Patent
Englin et al.

(10) Patent No.: US 7,356,650 B1
(45) Date of Patent: Apr. 8, 2008

(54) CACHE APPARATUS AND METHOD FOR ACCESSES LACKING LOCALITY

(75) Inventors: Donald C. Englin, Shoreview, MN (US); James A. Williams, White Bear Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 308 days.

(21) Appl. No.: 11/156,225

(22) Filed: Jun. 17, 2005

(51) Int. Cl.
*G06F 12/00* (2006.01)

(52) U.S. Cl. .................. 711/138; 711/136; 711/139; 711/134

(58) Field of Classification Search .............. None
See application file for complete search history.

(56) References Cited

U.S. PATENT DOCUMENTS

| | | | |
|---|---|---|---|
| 5,623,632 A * | 4/1997 | Liu et al. ................ 711/144 |
| 5,689,679 A * | 11/1997 | Jouppi ..................... 711/122 |
| 5,829,025 A * | 10/1998 | Mittal ..................... 711/122 |
| 6,202,129 B1 * | 3/2001 | Palanca et al. ........... 711/133 |
| 6,446,171 B1 * | 9/2002 | Henriksen ................ 711/136 |
| 2003/0028728 A1 * | 2/2003 | Ito ........................... 711/118 |

* cited by examiner

*Primary Examiner*—Hyung S. Sough
*Assistant Examiner*—Kaushikkumar Patel
(74) *Attorney, Agent, or Firm*—Charles A. Johnson; Robert Marley; Crawford Maunu PLLC

(57) ABSTRACT

Systems and methods are provided for a data processing system and a cache arrangement. The data processing system includes at least one processor, a first-level cache, a second-level cache, and a memory arrangement. The first-level cache bypasses storing data for a memory request when a do-not-cache attribute is associated with the memory request. The second-level cache stores the data for the memory request. The second-level cache also bypasses updating of least-recently-used indicators of the second-level cache when the do-not-cache attribute is associated with the memory request.

17 Claims, 5 Drawing Sheets

CACHE APPARATUS AND METHOD FOR ACCESSES LACKING LOCALITY

FIELD OF THE INVENTION

The present disclosure relates to caches in a data processing system.

BACKGROUND OF THE INVENTION

Transaction processing is a typical application for a data processing system. A transaction processing application may process and update information in a very large database and the performance of a transaction processing application may strongly depend on the latency for accesses to information in the database. A disk drive system may be required to provide sufficient storage to contain the entire database for a transaction processing application, but a disk drive system may adversely affect application performance because a disk drive system generally has a high access latency. In addition, performance of a data processing system may be affected by the latency of other accesses by the transaction processing application and other software on the data processing system, such as an operating system.

The performance of a data processing system may be improved by exploiting the temporal and spatial locality of the memory accesses by the data processing system. Memory access patterns often exhibit temporal locality because memory locations recently accessed are likely to soon be accessed again. Access patterns may also exhibit spatial locality because memory locations nearby memory locations already accessed are likely to also be accessed. For example, sequential accesses within a linear array have spatial locality.

Caches may be used to improve performance by exploiting the temporal and spatial locality of memory accesses to reduce the effective latency for memory accesses. Generally, the memory address space is broken into cache lines with each cache line larger than the largest possible access. A cache typically holds the cache lines containing the data that was most recently accessed. As the application on the data processing system accesses data, the data accessed that is not already in the cache is brought into the cache. Thus, after a cache line is brought into cache as a result of a data access, the data is available from the cache for subsequent accesses to the same data and subsequent accesses to nearby data on the cache line. When data for an access is available from a cache, the latency to access the data is reduced to the access latency for the cache. If the data is available from a cache for a significant portion of the accesses, the performance of a data processing system may be dramatically improved.

A trade-off made in designing a cache is that that a larger cache is likely to contain data for more of the accesses, but a larger cache is also likely to have a longer access latency. A hierarchy of caches may be used with the smaller and faster caches checked for the data before the larger and slower caches. The average effective latency for accesses may then be the sum of the products of the latency of each cache and memory times the respective fraction of the accesses fulfilled by the cache or memory.

Not all memory access patterns exhibit temporal and spatial locality. For example, the initialization of a large data structure, such as a database, may access more data than can be stored in all the caches in a data processing system. If the caches always store the most recently accessed information, the initialization of a large data structure may cause the caches to become filled with data for which locality of accesses is unlikely, and this data may displace data for which locality of accesses is likely, such that the initialization of a large data structure may reduce the effectiveness of the cache. An attribute may be associated with certain accesses that are expected to lack locality and the caches constructed to not store data for accesses having an attribute indicating lack of locality. However, the expected lack of locality may prove incorrect. For example, a large data structure may be copied and an attribute specifying a lack of locality for the large data structure may be incorrect when several copies are made in parallel.

A system that addresses these and other problems may therefore be desirable.

SUMMARY OF THE INVENTION

Various embodiments of the invention provide a data processing system including at least one processor, a first-level cache, a second-level cache, and a memory arrangement. The processor or processors issue a memory request. The first-level cache is coupled to the processor or processors and bypasses storing data for the memory request when a do-not-cache attribute is associated with the memory request. The second-level cache is coupled to the first-level cache and to the memory arrangement. The second-level cache bypasses updating of least-recently-used indicators of the second-level cache when the do-not-cache attribute is associated with the memory request and stores the data for the memory request.

Other embodiments of the invention provide a cache arrangement, including a storage arrangement, sets of replacement indicators, and cache control logic. The storage arrangement has storage for a plurality of sets. Each set has at least two tag-data pairs, and a memory address is associated with one of the sets. Each set of replacement indicators is associated with one of the sets of tag-data pairs and specifies a replacement order for the tag-data pairs of the set. The cache control logic is coupled to the storage arrangement and to the replacement indicators. The cache control logic, responsive to absence of a do-not-cache attribute associated with a memory request, stores memory data for a memory address of the memory request in a tag-data pair indicated by the replacement indicators as first in the replacement order in an associated set and updates the replacement indicators indicating that the tag-data pair is last in the replacement order in the associated set. The cache control logic bypasses update of the replacement indicators responsive to the do-not-cache attribute being associated with the memory request.

Further embodiments of the invention provide a method for accessing a memory address in a computing system. A requester issues a read request for data at the memory address and the data for the read request is provided to the requester. The data is stored in a first-level cache when a do-not-cache attribute is not associated with the read request. The data bypasses storage in the first-level cache when the do-not-cache attribute is associated with the read request. The data is stored in a set associative second-level cache. The second-level cache has a plurality of sets and each set includes at least two tag-data pairs. The data is stored in a set associated with the memory address and in a first tag-data pair of the set that is first in a replacement order of the tag-data pairs of the set. The replacement order of the tag-data pairs in the set associated with the memory address is adjusted when a do-not-cache attribute is not associated with the read request. The adjustment of the replacement order makes the first tag-data pair last in the replacement order. Adjustment of the replacement order is bypassed when the do-not-cache attribute is associated with the read request.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
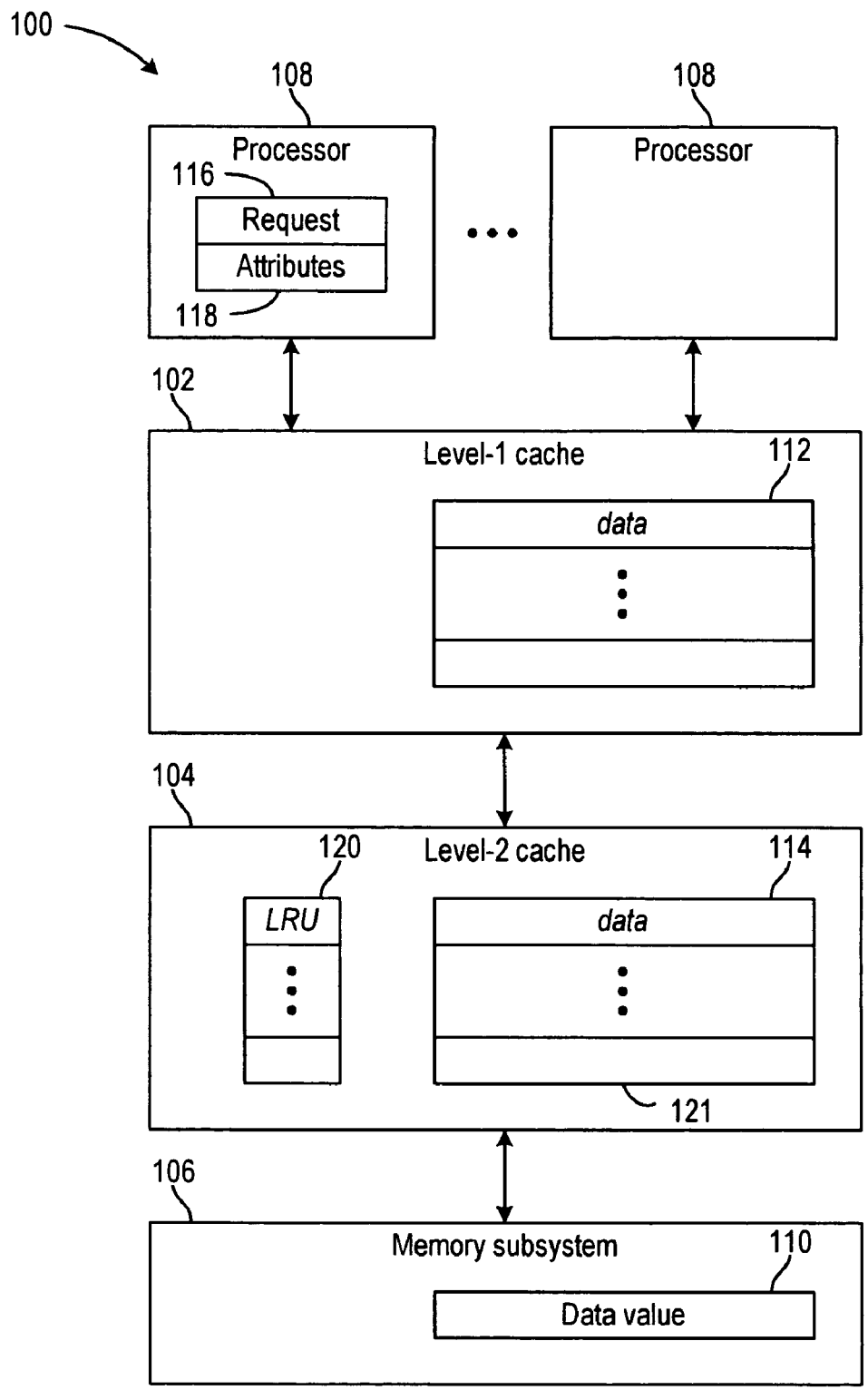
FIG. 1 is a block diagram of a computer system with first and second level caches according to various embodiments of the invention.

FIG. 1 is a block diagram of a computer system 100 with first and second level caches 102 and 104 according to various embodiments of the invention. The first level cache 102 and the second level cache 104 store data from a subset of the locations in the memory subsystem 106 that have been recently accessed by processors 108.

Typically, the first and second level caches 102 and 104 are empty following initialization of a computer system 100. During operation of the computer system 100, a data value 110 may be moved from the memory subsystem 106 to data storage 112 in the first level cache 102 and to data storage 114 in the second level cache 104 due to a memory request 116 by processors 108. A memory request 116 from processors 108 generally accesses a data value 110 that is already stored in data storage 114 of second level cache 104 faster than accessing the data value 110 from memory subsystem 106. Similarly, a memory request 116 from processors 108 generally accesses a data value 110 that is already stored in data storage 112 of first level cache 102 faster that accessing the data value 110 from either memory subsystem 106 or data storage 114 of second level cache 104. In one embodiment, the memory subsystem 106 may also include a third level cache (not shown).

A data value 110 that is not present in caches 102 and/or 104 may be brought into caches 102 and/or 104 by a memory request 116, such as a read request or write request, which may have attributes 118 that control certain aspects of the processing of the transaction by the computer system 100. A memory request may have no attributes or a normal attribute for a typical memory request that is expected to have locality, such as temporal and/or spatial locality, and a memory request may have a do-not-cache attribute 118 to indicate that the memory request is expected to lack locality. It will be appreciated that a memory request may alternatively have a do-cache attribute to indicate locality is expected and no attributes or a normal attribute to indicate lack of locality is expected. The operation of caches 102 and 104 may depend on the attributes of a memory request.

In one embodiment, a data value 110 is not brought into first level cache 102 for a memory request 116 that has a do-not-cache attribute. Not bringing in the data value for a memory request that has a do-not-cache attribute may reserve first level cache 102 for data values that are expected to have locality. For a memory request that does not have the do-not-cache attribute, a data value from memory subsystem 106 or a data value currently stored in data storage 114 of second level cache 104 may be brought into data storage 112 of first level cache 102 when this data value 110 is not already present in first level cache.

In one embodiment, a data value 110 can be stored in second level cache 104 in multiple locations in storage 114, and these multiple locations are ordered by least recently used (LRU) indicators 120 from least recently used to most recently used. For a memory request 116 accessing a data value 110 not already present in the second level cache 104, the data value is stored in the location, for example location 121, of storage 114 that the LRU indicators 120 indicate is least recently used. In addition, if the memory request 116 has the do-not-cache attribute, the LRU indicators 120 are not updated and this location 121 remains least recently used, otherwise the LRU indicators 120 are updated to indicate that this location 121 is most recently used.

The LRU indicators 120 may be implemented as a list of location identifiers that are ordered from the identifier of the least recently used location to the identifier of the most recently used location of storage 114. Updating the LRU indicators 120 to indicate location 121 is most recently used may involve moving the identifier for location 121 from a current position in the list to the last position in the list. It will be appreciated that in another embodiment LRU indicators 120 may be implemented as a value associated with each location, with the value indicating the position of the associated location in the order from least recently used to most recently used. In an alternative embodiment, the order provided by LRU indicators 120 may be a partial order for the multiple locations that can store a particular data value 110 instead of a full order. For example, a second level cache 104 that is 4-way set associative may allow a particular data value 110 to be stored into any one of 4 tag-data pairs of the set associated with the memory address for the data value 110. The LRU indicators 120 may track only the most recently used and second most recently used tag-data pairs for each set, resulting in some ambiguity in which tag-data pair is least recently used.

For a memory request 116 accessing a data value 110 that is absent from first level cache 102 and already present in the second level cache 104, the access is completed using data from the appropriate location in data storage 114. In addition, if the memory request 116 has the do-not-cache attribute 118 the LRU indicators 120 are not updated. Otherwise the LRU indicators 120 are updated to indicate that this location in data storage 114 is most recently used.

After each memory request 116 with the do-not-cache attribute 118, the data for the memory request 116 may be stored in a location of storage 114 in second level cache 104, but the LRU indicators 120 are not updated. In particular, if the LRU indicators 120 indicated that the location 121 was least recently used before the memory request 116 with the do-not-cache attribute 118, then the LRU indicators 120 still indicate that the location 121 is least recently used after the memory request 116 with the do-not-cache attribute 118. Thus, a data value 110 that is accessed only by memory requests 116 each having the do-not-cache attribute 118 is always stored in a location 114 that is least recently used.

For example, a second level cache 104 that is 4-way set associative has one tag-data pair of each set that is least recently used. A data value 110 that is accessed only by memory requests each having the do-not-cache attribute is always stored in a tag-data pair that is least recently used. Thus, only one tag-data pair of each set of the 4-way set associative cache 104 is affected by memory requests accessing data values that are only accessed by memory requests having the do-not-cache attribute. Consequently, the remaining three tag-data pairs of a second level cache 104 that is 4-way set-associative are reserved for storing data values 110 that are expected to have locality. Thus, data expected to lack locality may displace at most one-quarter of the contents of a second level cache 104 that is 4-way set-associative.

The LRU indicators 120 indicate the order in which locations within a set of locations in data storage 114 are accessed by memory requests (other than memory requests with the do-not-cache attribute). The LRU indicators 120 may also be called replacement indicators 120.

Example sources for attributes 118, such as the do-not-cache attribute, of a memory request 116 include encoding the attributes in the opcode for the instruction that causes processor 108 to generate the memory request 116, selecting the attributes 118 based on a data size provided for a block copy operation, using attributes 118 corresponding to a type for a memory bank obtained during a virtual-to-physical address translation for the address of the memory request 116, and other sources.

Figure 2:
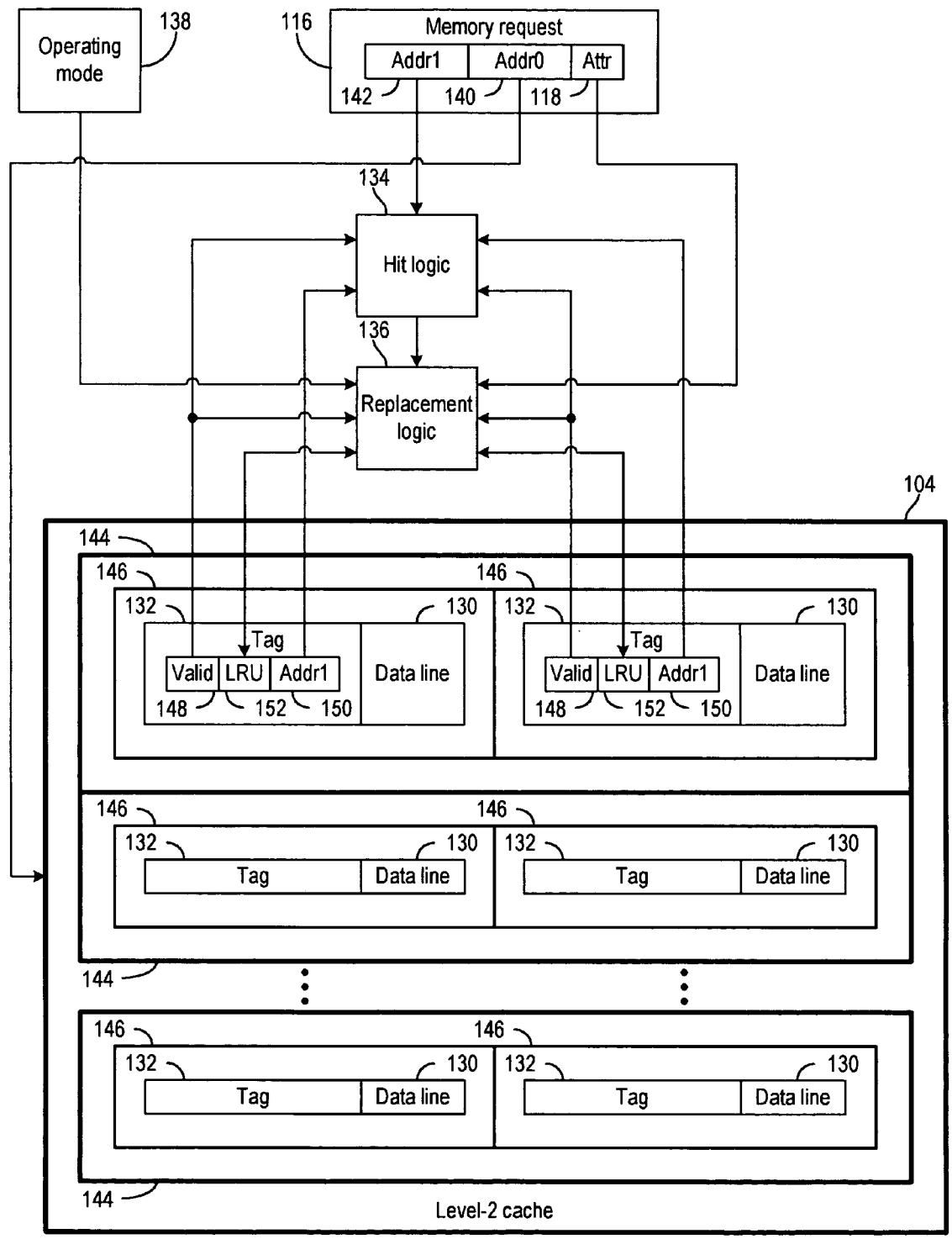
FIG. 2 is a block diagram of a 2-way set-associative second level cache according to various embodiments of the invention.

FIG. 2 is a block diagram of a 2-way set-associative second level cache according to various embodiments of the invention. Data from a memory subsystem is stored in second level cache 104 in data lines 130, the data lines having associated tags 132. Second level cache 104 has cache control logic including hit logic 134 and replacement logic 136. Hit logic 134 determines whether data for a memory request 116 is present within one of data lines 130 in the second level cache 104. When data for a memory request 116 is not present in the second level cache 104, the data for the memory request 116 is obtained from the memory subsystem and replacement logic 136 determines the data line in which to store the data obtained from the memory subsystem. In one embodiment, the operation of the replacement logic 136 is dependent on the operating mode register 138.

A memory request 116 includes a memory address that may have subfields of a cache index portion 140 and a match portion 142. The memory request 116 may also include zero or more attributes 118, such as a do-not-cache attribute.

On receiving a memory request 116, the cache index portion 140 is used to select one of sets 144 in the second level cache 104. Because second level cache 104 is 2-way set associative, each of sets 144 includes two tag-data pairs 146, each pair containing a data line 130 and a tag 132. Each tag 132 includes a valid indicator 148 that indicates either the associated data line 130 contains valid data for a memory address or the tag-data pair 146 is empty. A particular tag-data pair of a set may store data for any memory address that includes the cache index portion 140 corresponding to the set.

Typically, the size of the data lines 130 exceeds the size of the data requested by any memory request 116, although the size of the data lines 130 may equal the size of the largest possible memory request 116 in certain embodiments. For a memory request 116 that is a read request and for which the match portion 142 matches the tag address 150 of a valid (148) tag-data pair 146 of one of sets 144 selected by the cache index portion 140, the appropriate portion of the data line of the tag-data pair is read and returned to satisfy the read request 116. For a memory request 116 that is a write request with write data and for which the match portion 142 matches the tag address 150 of a valid (148) tag-data pair 146 of one of the sets 144 selected by the cache index portion 140, the appropriate portion of the data line of the tag-data pair is written with the write data while the remainder of the data line is not modified.

In various embodiments, the value in operating mode register 138 and the attributes 118 of the memory request 116 determine the cache miss behavior when the hit logic 134 determines that the data for a memory request 116 is not available in the second level cache 104. In a retain operating mode or when the attributes 118 of the memory request do not include a do-not-cache attribute, a cache line of data that includes the data for the memory request 116 is obtained from the memory subsystem and one of data lines 130 of the second level cache 104 is updated using this cache line. The contents of the second level cache 104, including the tags 132 and data lines 130, are not modified for a cache miss in a discard operating mode when the attributes 118 of the memory request 116 include a do-not-cache attribute.

For a memory request 116 that is a read request without a do-not-cache attribute 118, the missing cache line of data is obtained from the memory subsystem and written to one of data lines 130 of the second level cache 104. In the retain operating mode for a memory request 116 that is a read request, the missing cache line of data is obtained from the memory subsystem and written to one of data lines 130 of the second level cache 104 regardless of the attributes 118. For a memory request 116 that is a write request without a do-not-cache attribute 118, the write data from the write request is merged with the cache line obtained from the memory subsystem and the result is written to one of data lines 130 of the second level cache 104. In the retain operating mode 138 for a memory request 116 that is a write request, the write data from the write request is merged with the cache line obtained from the memory subsystem and the result is written to one of data lines 130 of the second level cache 104 regardless of the attributes 118.

The tag-data pair 146 including the data line 130 that is written for a cache miss is selected by the replacement logic 136. Generally, when a tag-data pair is empty in the one of sets 144 selected by cache index portion 140, an empty tag-data pair is selected by the replacement logic 136. When no tag-data pair 146 is empty in the selected set, the tag-data pair 146 that is least recently used, as indicated by the replacement indicators 152 of the tag 132 of the selected set, is selected by the replacement logic 136. When the selected tag-data pair is not empty, the values currently in the data line of the selected tag-data pair are displaced and may be returned to the memory subsystem. The memory address, including cache index portion 140 and match portion 142, of a memory request 116 associates the memory request 116 with one of sets 144 and one of the tag-data pairs 146 in the set. The tag-data pair associated with the memory request 116 is either the tag-data pair (in the set selected by the cache index portion 140 of the memory request) having a tag address 150 that matches the match portion 142 of the memory request, or a tag-data pair that is empty in the set.

The replacement logic 136 may update the replacement indicators 152 of one of sets 144 during a cache miss for a memory request 116. When the attributes 118 of the memory request 116 include a do-not-cache attribute, the replacement indicators 152 are not modified. When the attributes 118 of the memory request 116 do not include the do-notcache attribute, the replacement indicators 152 of the set 144 are updated to indicate the one of tag-data pairs 146 receiving the updated data line is most recently used.

The replacement logic 136 may also update the replacement indicators 152 in the appropriate one of sets 144 when the data for the memory request 116 is found in the second level cache 104. When the attributes 118 of the memory request 116 include a do-not-cache attribute, the replacement indicators 152 are not modified. When the attributes 118 of the memory request 116 do not include the do-not-cache attribute, the replacement indicators 152 of the set 144 are updated to indicate the one of tag-data pairs 146 in which the data is found is most recently used.

It will be appreciated that each of sets 144 may include a single replacement indicator (not shown) and each of tag-data pair 146 may include a data line 130 and a tag 132 that omits the replacement indicator 152. The single replacement indicator may combine the functions of the separate replacement indicators 152 of the tag-data pairs 146, and the single replacement indicator may be contained in a separate storage array from the tag-data pairs 146 to expedite a possible read-modify-update of the single replacement indicator for each memory request 116. It will also be appreciated that each of tags 132 may include other fields, such as a modified indicator that indicates whether the data line 130 has been updated by a memory request 116 that is a write request.

The second level cache 104 may contain more than two tag-data pairs per set. In one embodiment, the second level cache 104 is 4-way set-associative with four tag-data pairs per set. In one embodiment, the first level cache 102 of FIG. 1 is 4-way set-associative with four tag-data pairs per set and the operation of the first level cache 102 is similar to the discard operating mode 138 of the second level cache 104.

Figure 3:
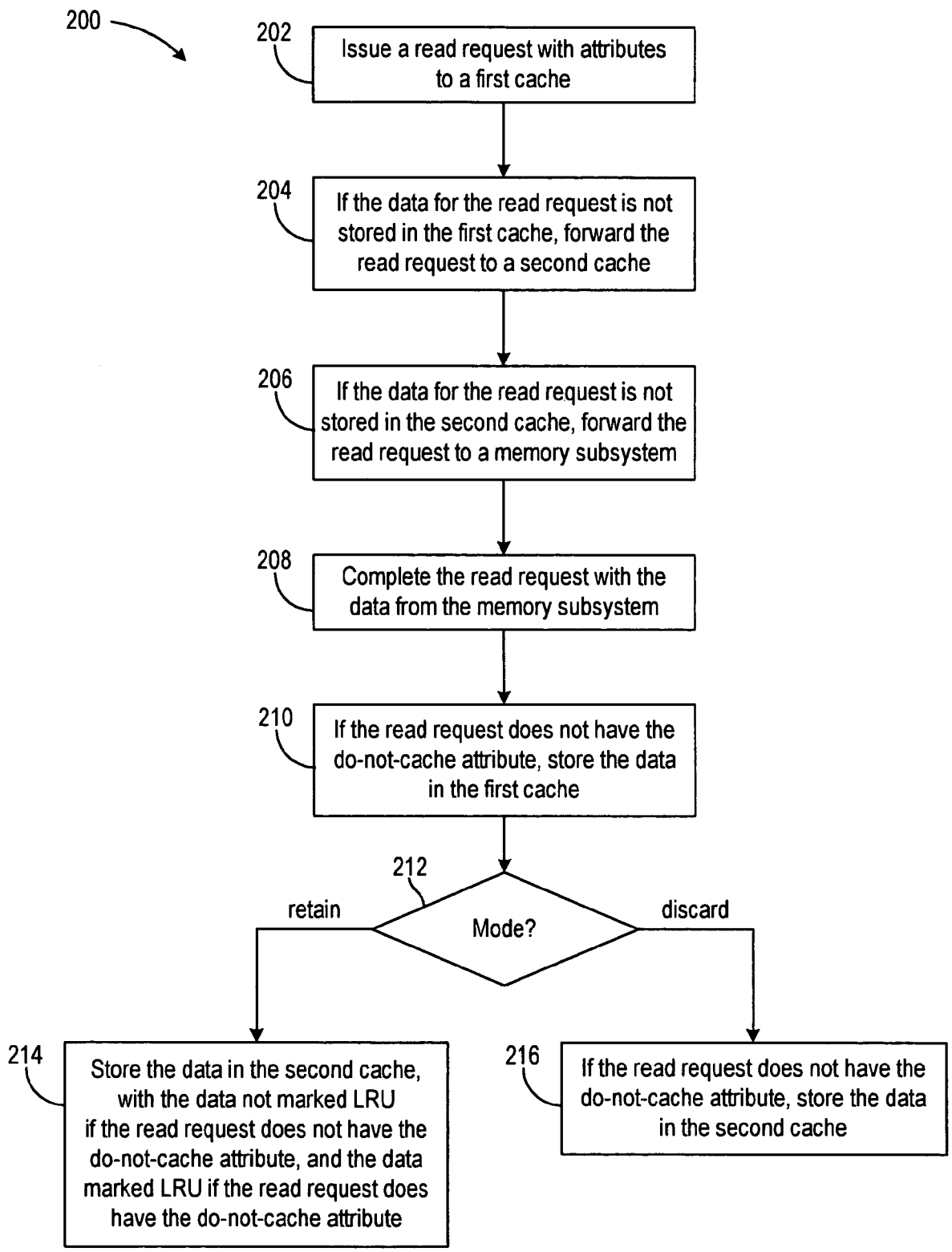
FIG. 3 is a flowchart of an example process for supplying data for a read request according to various embodiments of the invention.

FIG. 3 is a flowchart of an example process 200 for supplying data for a read request according to various embodiments of the invention. A first level cache, a second level cache, and a memory subsystem may be used to supply the data for the read request.

At step 202, the read request is issued from an agent, such as a processor, to a first level cache. The read request includes a memory address and attributes, such as a do-not-cache attribute. At step 204, the first level cache is checked for the presence of the data for the read request using the memory address. If the data for the read request is absent from the first level cache, the read request is forwarded to the second level cache. At step 206, the second level cache is checked for the presence of the data for the read request using the memory address. If the data for the read request is absent from the second level cache, the read request is forwarded to the memory subsystem. At step 208, the data at the memory address for the read request is obtained from the memory subsystem and the data is provided to the agent issuing the read request to complete the read request.

At step 210, the data obtained from the memory subsystem for the read request is stored in the first level cache when the read request does not include a do-not-cache attribute and the data is not stored in the first level cache when the read request includes a do-not-cache attribute. In another embodiment, the data obtained from the memory subsystem is stored in the first level cache when the read request includes a do-not-cache attribute if a corresponding location is empty in the first level cache.

The value of a mode register is checked at decision 212. For a retain value of the mode register process 200 proceeds to step 214 and for a discard value of the mode register process 200 proceeds to step 216.

At step 214, the data obtained from the memory subsystem for the read request is stored in the second level cache. The data is stored in the second level cache in a location marked as least recently used by replacement indicators for the second level cache. It will be appreciated that an available location that is empty is not currently being used and may consequently be considered least recently used. The replacement indicators are updated to mark the data most recently used if the read request does not have the do-not-cache attribute. If the read request does have the do-not-cache attribute, the replacement indicators either are not updated and the location remains least recently used or the replacement indicators are updated to again mark the location as least recently used.

At step 216, the data obtained from the memory subsystem for the read request is stored in the second level cache when the read request does not include a do-not-cache attribute and the data is not stored in the second level cache when the read request includes a do-not-cache attribute. In another embodiment, the data obtained from the memory subsystem is stored in the second level cache when the read request includes a do-not-cache attribute if a corresponding location is empty in the second level cache.

Figure 4:
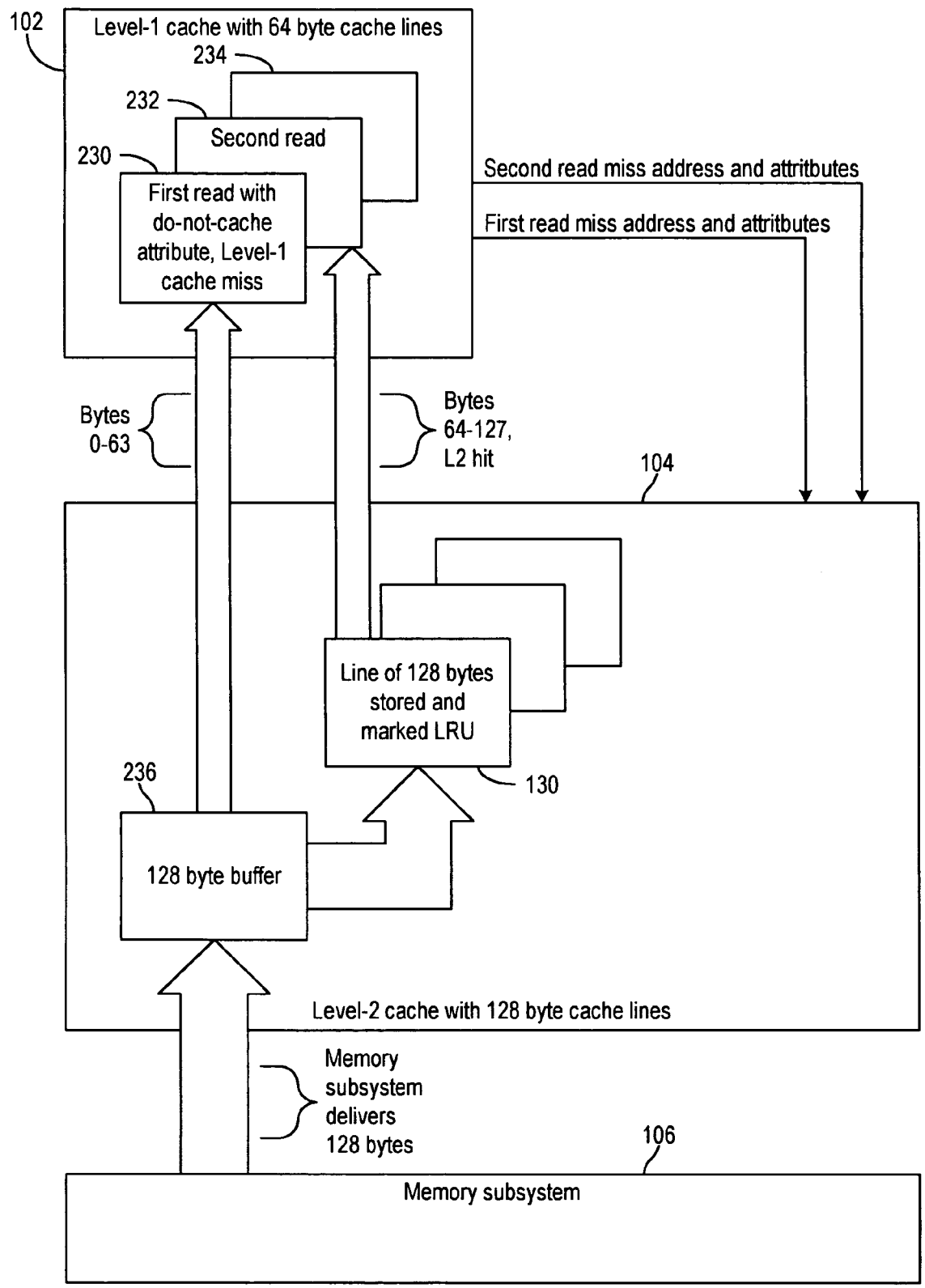
FIG. 4 is a block diagram of first and second level caches having differing cache line sizes according to various embodiments of the invention.

FIG. 4 is a block diagram of first and second level caches having different cache line sizes according to various embodiments of the invention. In one embodiment, the line size of the second level cache 104 may be 128 bytes and the line size of the first level cache 102 may be 64 bytes. The first level cache may be a write-through cache and the second level cache may be a write-back cache.

Memory requests may include attributes, such as a do-not-cache attribute, to alter the behavior of the first and second level caches 102 and 104. A memory request with a do-not-cache attribute indicates that the memory request is not expected to have locality, such as temporal or spatial locality. A usage for the do-not-cache attribute is in a memory read to a data location that is expected to be read only once, such as in a one-time read of a series of sequential addresses of a data structure. In one embodiment, the do-not-cache attribute is associated with the data structure. The operation of caches 102 and 104 may limit the displacement of data expected to have locality by data not expected to have locality.

In one embodiment, the first level cache 102 does not store data obtained from the second level cache or the memory subsystem for a memory request with the do-not-cache attribute. This in effect reserves the first level cache 102 for data that is expected to have locality.

A series of memory reads 230, 232, and 234 to sequential addresses may each have the do-not-cache attribute and may access data that is initially not present in the first and second level caches 102 and 104. The first memory read 230 may be forwarded by the first and second level caches 102 and 104 to the memory subsystem 106. In one embodiment, the memory subsystem 106 may return 128 bytes to a buffer 236 in the second level cache 104, and the second level cache 104 may return the first 64 bytes of the data in buffer 236 to the first level cache 102, which conveys the data to a requester and does not store the data. In parallel, the second level cache 104 may also write the data from the buffer 236 into a data line 130 of the second level cache 104 with the data marked least recently used. This writing of the data line 130 may displace data already in the second level cache 104, possibly including data expected to have locality.

The second memory read 232 is forwarded by the first level cache 102 to the second level cache 104. The second level cache 104 provides the data for the second memory read 232 from the second 64 bytes of the data line 130. The access pattern repeats at the subsequent memory read 234, with memory reads in the series alternating between accessing data from the memory subsystem 106 and accessing data from the second level cache 104. Performance may be improved because only memory reads 230 and 234 access data from the memory subsystem 106 while memory read 232 accesses data from the second level cache 104. Performance may also be improved because the data brought into the second level cache 104 by the series of reads is marked least recently used and is consequently a first candidate for replacement by future accesses. These future accesses may be other memory reads in the series of memory reads 230, 232, and 234.

Figure 5:
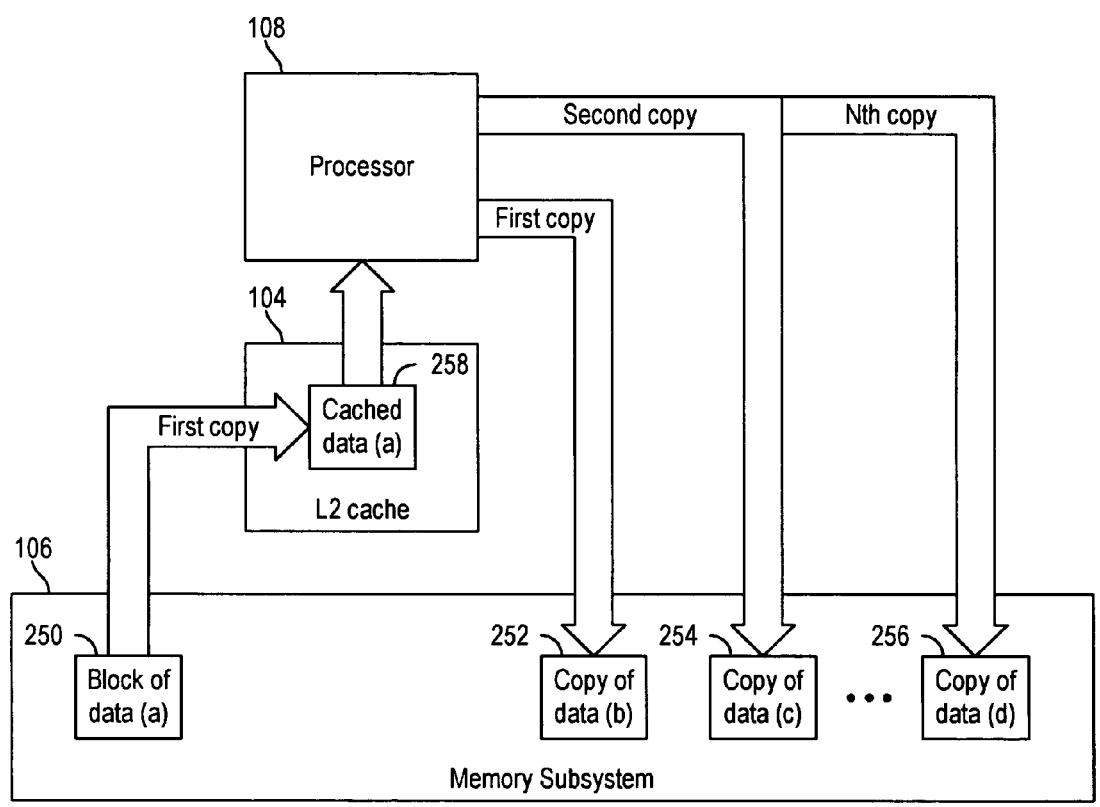
FIG. 5 is a block diagram illustrating operation of a second level cache in a scenario in which multiple copies are made of data having a do-not-cache attribute according to various embodiments of the invention.

FIG. 5 is a block diagram illustrating operation of a second level cache 104 in a scenario in which multiple copies are made of data having a do-not-cache attribute according to various embodiments of the invention. A data block 250 is copied to multiple locations 252, 254, and 256 in a memory subsystem 106.

The memory reads of data block 250 from processor 108 may include a do-not-cache attribute because the data is expected to be read only once. For example, the data block 250 may be larger than the second level cache 104 and the do-not-cache attribute is used to limit the displacement of data currently in the second level cache 104 by filling the second level cache 104 with data from the data block 250. During a first block copy of data block 250 to copy 252, the block of data 250 or a portion of the block of data 250 may be stored as cached data 258 in second level cache 104. Subsequent block copies of data block 250 to copies 254 and 256 may obtain the cached data 258 from second level cache 104, thereby increasing performance for the subsequent block copies.

Second level cache 104 may be n-way set associative and data block 250 may fit within one tag-data pair of the sets of the second level cache 104. After completing the first copy of data block 250 to copy 252, the entire data block 250 may be stored as cached data 258 that is marked least recently used. Subsequent block copies of data block 250 to copies 254 and 256 are likely to obtain the cached data 258 from second level cache 104 as long as these subsequent block copies are not separated from the first copy of block 250 to copy 252 by other accesses that would replace the least recently used data in the second level cache 104.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A data processing system, comprising:
   at least one processor that issues memory requests responsive to instruction execution, the memory requests including a first memory request;
   a first-level cache coupled to the at least one processor, wherein the first-level cache bypasses storing data for the first memory request responsive to a do-not-cache attribute associated with the first memory request;
   a second-level cache coupled to the first-level cache, wherein the second-level cache bypasses updating of least-recently-used indicators of the second-level cache responsive to the do-not-cache attribute associated with the first memory request and stores the data for the first memory request, wherein the second-level cache stores the data for the first memory request responsive to absence of a do-not-cache attribute associated with the first memory request, stores the data for the first memory request responsive to a mode for the second-level cache having a first value and independent of presence or absence of the do-not-cache attribute, and bypasses storing the data for the first memory request responsive to the do-not-cache attribute associated with the memory request and the mode for the second-level cache having a second value; and
   a memory arrangement coupled to the second-level cache.

2. The data processing system of claim 1, wherein the second-level cache stores the data for the first memory request at a location indicated as least recently accessed by the least-recently-used indicators.

3. The data processing system of claim 1, wherein the second-level cache stores the data for the first memory request in a location in the second-level cache and updates the least-recently-used indicators indicating that the location is most recently accessed responsive to absence of a do-not-cache attribute associated with the first memory request.

4. The data processing system of claim 1, wherein a size of a cache line of the first-level cache is different than a size of a cache line of the second-level cache.

5. The data processing system of claim 1, wherein the first-level cache is a write-through cache and the second-level cache is a write-back cache.

6. The data processing system of claim 1, wherein the second-level cache is at least 2-way set-associative and has a plurality of sets, each set having at least 2 tag-data pairs.

7. The data processing system of claim 6, wherein the least-recently-used indicators of the second-level cache indicate for each set, one of the tag-data pairs in the set as least recently accessed.

8. The data processing system of claim 6, wherein the first memory request is issued with an address for the data, and the second-level cache associates the address with one set of the plurality of sets and associates the address with a tag-data pair in the set.

9. The data processing system of claim 8, wherein the second-level cache associates the address with the tag-data pair that is least recently accessed in the set responsive to absence of the data in the second-level cache.

10. The data processing system of claim 8, wherein the second-level cache provides access to the data in the tag-data pair of the set responsive to presence of the data in the second-level cache.

11. The data processing system of claim 8, wherein the second-level cache updates the least-recently-used indicators indicating that the tag-data pair of the set is most recently accessed responsive to absence of a do-not-cache attribute associated with the first memory request.

12. A cache arrangement for a data processing system, comprising:
    a first level cache;
    a second level cache coupled to the first level cache, the second-level cache including:
      a storage arrangement having storage for a plurality of sets of tag-data pairs, wherein each set has at least two tag-data pairs, and each memory address of a plurality of memory addresses is associated with one of the sets of tag-data pairs;
      a plurality of sets of replacement indicators respectively associated with the sets of tag-data pairs, and each set of replacement indicators specifying a replacement order for the associated set of tag-data pairs; and cache control logic coupled to the storage arrangement and to the replacement indicators, wherein the cache control logic, responsive to absence of a do-not-cache attribute associated with a memory request, stores data indicative of a memory address of the memory request and data referenced by the memory address in one of the tag-data pairs of the set of tag-data pairs associated with the memory address, the one of the tag-data pairs indicated as first in the replacement order by the one of the sets of replacement indicators associated with the one of the tag-data pairs, and updates the one of the sets of replacement indicators indicating that the one of the tag-data pairs is last in the replacement order specified by the one of the sets of replacement indicators, and the cache control logic bypasses update of the one of the sets of replacement indicators and stores data referenced by the memory address in the one of the tag-data pairs, responsive to the do-not-cache attribute being associated with the memory request;

wherein the first level cache stores the data referenced by the memory address in response to absence of the do-not-cache attribute, and bypasses storing of the data referenced by the memory address in response to the do-not-cache attribute being associated with the memory request; and a mode register coupled to the cache control logic, wherein the cache control logic stores the memory data for the memory request in the tag-data pair in the associated set responsive to the mode register having a first value and independent of presence or absence of the do-not-cache attribute, and bypasses storage of the memory data for the memory request in the tag-data pair in the associated set responsive to the do-not-cache attribute being associated with the memory request and the mode register having a second value.

13. The cache arrangement of claim 12, wherein the cache control logic stores the memory data for the memory request in the tag-data pair in the associated set.

14. The cache arrangement of claim 12, wherein, for the memory request with write data to write to the memory address, the cache control logic updates with the write data a portion of the tag-data pair associated with the memory address in the set associated with the memory address.

15. A method for accessing a memory address in a computing system, comprising issuing from a requester a read request for data at the memory address;

providing the data for the read request to the requester;

storing the data in a first-level cache in response to absence of a do-not-cache attribute associated with the read request;

bypassing storage of the data in the first-level cache in response to the do-not-cache attribute being associated with the read request;

storing the data in a set associative second-level cache, the second-level cache having a plurality of sets and each set including at least two tag-data pairs, wherein the data is stored in a set associated with the memory address and in a first tag-data pair of the set that is first in a replacement order of the tag-data pairs of the set;

adjusting the replacement order of the tag-data pairs in the set associated with the memory address in response to absence of a do-not-cache attribute associated with the read request, wherein the first tag-data pair is made last in the replacement order;

bypassing adjustment of the replacement order in response to the do-not-cache attribute being associated with the read request;

storing the data in the second-level cache responsive to absence of a do-not-cache attribute associated with the read request;

storing the data in the second-level cache responsive to a mode for the second-level cache having a first value and independent of presence or absence of the do-not-cache attribute; and bypassing storing of the data in the second-level cache responsive to the do-not-cache attribute associated with the memory read and the mode for the second-level cache having a second value.

16. The method of claim 15, wherein providing the data for the read request to the requester further comprises:

providing the data from the first-level cache in response to presence of the data in the first-level cache;

providing the data from the second-level cache in response to absence of the data in the first-level cache and presence of the data in the second-level cache; and providing the data from a memory arrangement in response to absence of the data in the first-level cache and second-level cache.

17. The method of claim 15, further comprising:

issuing from the requester a write request with update data to update the data at the memory address;

updating the first-level cache with the update data in response to presence of the data in the first-level cache; and updating the second-level cache with the update data.

* * * * *